(12) United States Patent
Shimek et al.

(10) Patent No.: US 11,053,001 B2
(45) Date of Patent: Jul. 6, 2021

(54) LOW-DRAG FAIRING AND ROTOR ASSEMBLY

(71) Applicant: Bell Textron Inc., Fort Worth, TX (US)

(72) Inventors: Glenn Alan Shimek, Kennedale, TX (US); Jared Mark Paulson, Colleyville, TX (US); Tom Donovan, Fort Worth, TX (US); Michael Christopher Burnett, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 125 days.

(21) Appl. No.: 16/447,618

(22) Filed: Jun. 20, 2019

(65) Prior Publication Data
US 2020/0398979 A1 Dec. 24, 2020

(51) Int. Cl.
*B64C 27/51* (2006.01)
*B64C 27/48* (2006.01)

(52) U.S. Cl.
CPC ............ *B64C 27/51* (2013.01); *B64C 27/48* (2013.01)

(58) Field of Classification Search
CPC ....... B64C 27/001; B64C 27/39; B64C 27/48; B64C 27/51; B64C 7/00; B64C 7/02; B64C 11/02; B64C 11/04; B64C 11/06
See application file for complete search history.

(56) References Cited

U.S. PATENT DOCUMENTS

| 2,493,869 | A | * | 1/1950 | Hafner | B64C 27/39 416/103 |
| 4,212,588 | A | * | 7/1980 | Fradenburgh | B64C 27/001 416/141 |
| 4,373,862 | A | * | 2/1983 | Ferris | B64C 27/006 116/264 |
| 5,141,398 | A | * | 8/1992 | Bietenhader | B64C 27/51 416/107 |
| 5,316,442 | A | * | 5/1994 | Mouille | B64C 27/35 416/134 A |
| 5,645,400 | A | * | 7/1997 | Hunter | B64C 27/33 416/134 A |
| 7,153,094 | B2 | * | 12/2006 | Sehgal | B64C 27/001 415/119 |
| 7,530,787 | B2 | * | 5/2009 | Bertolotti | B64C 1/00 416/124 |
| 8,257,051 | B2 | * | 9/2012 | Stamps | B64C 27/32 416/244 R |
| 9,415,866 | B2 | * | 8/2016 | D'Anna | B64C 27/35 |
| 9,616,996 | B2 | * | 4/2017 | Schmaling | B64C 27/35 |

(Continued)

OTHER PUBLICATIONS

Paulson, Jared Mark, et al.; "Low-Drag Rotor Blade Extension"; U.S. Appl. No. 16/447,421, filed Jun. 20, 2019; 33 pages.

*Primary Examiner* — Brian P Wolcott
(74) *Attorney, Agent, or Firm* — Shackelford, Bowen, McKinley & Norton, LLP (57) ABSTRACT

A rotorcraft includes a main rotor system coupled to a mast and a rotor assembly. The rotor assembly includes a yoke comprising a rotor coupling, a first damper mount attached to the rotor coupling, a rotor extension configured to couple to the rotor coupling and comprising a second damper mount, a damper coupled to the first and second damper mounts, and a fairing enclosing the damper and the yoke.

20 Claims, 5 Drawing Sheets

(56) References Cited

U.S. PATENT DOCUMENTS

| | | |
|---|---|---|
| 9,873,507 B2* | 1/2018 | Foskey ................... B64C 27/35 |
| 9,982,737 B2* | 5/2018 | Beltran ..................... F16F 1/38 |
| 2012/0175461 A1* | 7/2012 | van der Westhuizen .................... B64C 27/025 244/17.25 |
| 2013/0112810 A1 | 5/2013 | Amante et al. |

* cited by examiner

LOW-DRAG FAIRING AND ROTOR ASSEMBLY

BACKGROUND

This section provides background information to facilitate a better understanding of the various aspects of the disclosure. It should be understood that the statements in this section of this document are to be read in this light, and not as admissions of prior art.

Drag is a key factor that limits the performance of a helicopter, particularly its top speed. Drag opposes the motion of the helicopter as the helicopter moves through the air. The total amount of drag acting upon a helicopter results from the summation of profile drag, induced drag, and parasitic drag. Profile drag is caused by the frictional resistance of the rotor blades passing through air. Induced drag is caused by the circulation of air around the rotor blade as lift is generated by the rotor blade. Parasitic drag is caused by the movement of non-lift generating components through air. Parasitic drag varies with the square of the velocity of the helicopter, making it a large component of the total amount of drag acting on a high-speed helicopter (e.g., helicopters that achieve speeds of 180 knots or more).

SUMMARY

An example of a low-drag rotor assembly includes a yoke having a rotor coupling, a first damper mount attached to the rotor coupling, a rotor extension configured to couple to the rotor coupling and comprising a second damper mount, a damper coupled to the first and second damper mounts, and a fairing enclosing the damper and the yoke.

An example of a rotorcraft includes a main rotor system coupled to a mast and a rotor assembly that includes at least one rotor blade. The rotor assembly includes a yoke comprising a rotor coupling, a first damper mount attached to the rotor coupling, a rotor extension configured to couple to the rotor coupling and comprising a second damper mount, a damper coupled to the first and second damper mounts, and a fairing enclosing the damper and the yoke.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
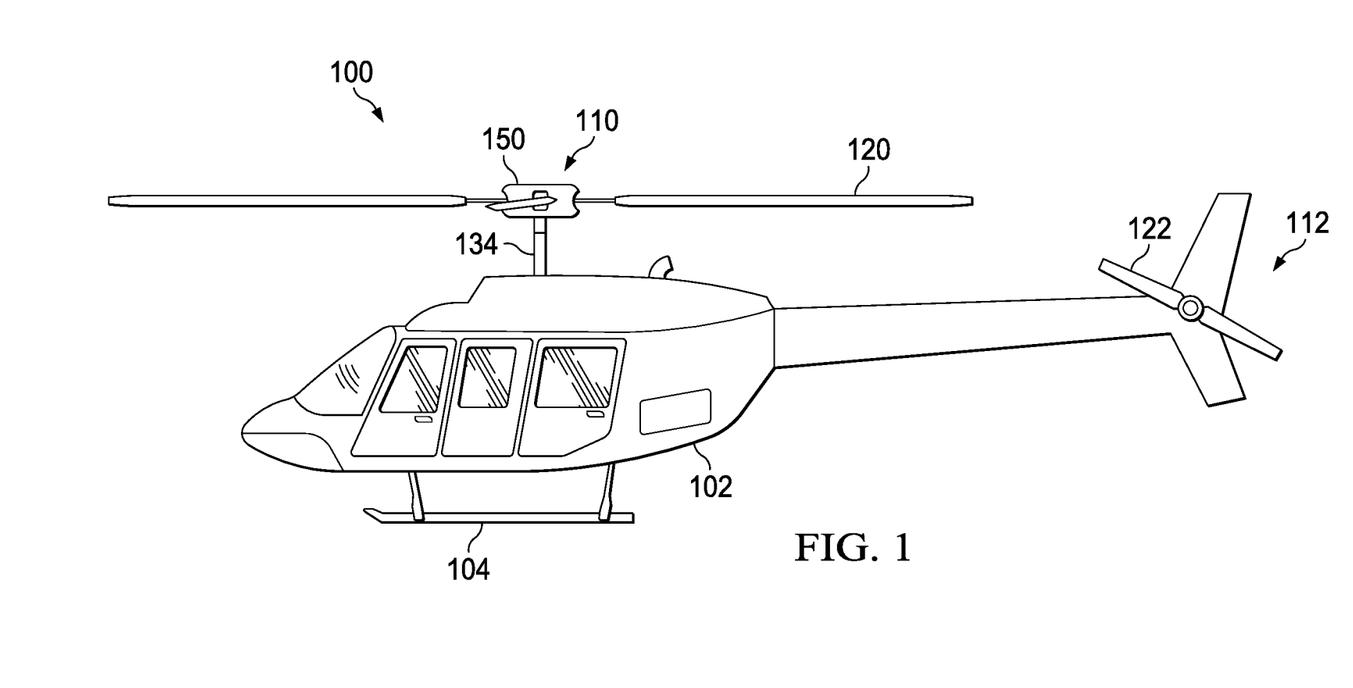
FIG. 1 illustrates a rotorcraft in accordance with aspects of the disclosure.
Figure 2A:
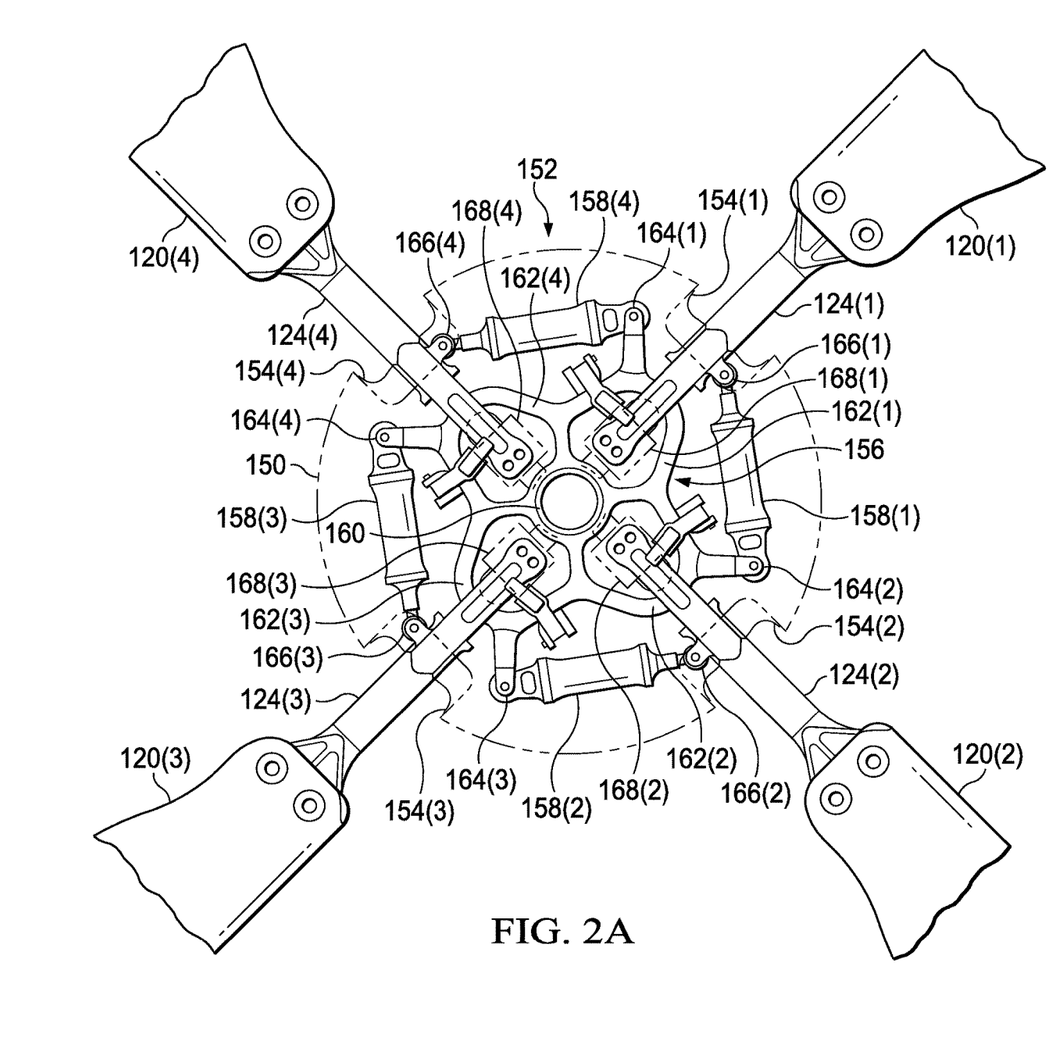
FIGS. 2A and 2B illustrate top and side views, respectively, of a faired rotor system in accordance with aspects of the disclosure.

FIG. 1 illustrates an example of a rotorcraft 100. Rotorcraft 100 includes a fuselage 102, a main rotor system 110 with rotor blades 120, and a tail rotor system 112 with tail rotor blades 122. An engine within fuselage 102 supplies main rotor system 110 and tail rotor system 112 with torque to rotate rotor blades 120 and tail rotor blades 122. A fairing 150 covers at least a portion of a rotor hub 152 (see FIG. 2) that couples rotor blades 120 to a mast 134. Fairing 150 improves the aerodynamic efficiency of rotorcraft 100 by reducing drag created by rotor hub 152. As illustrated in FIG. 1, rotorcraft 100 includes four rotor blades 120. In other aspects, rotorcraft 100 could include as few as two or three rotor blades 120 or more than four rotor blades 120 (e.g., five, six, etc.). Landing gear 104 extend from fuselage 102 and support rotorcraft 100 when rotorcraft 100 is landing or when rotorcraft 100 is at rest on the ground.

Generally speaking, the faster a rotor blade moves through the air and the greater an angle of attack of the rotor blade, the more lift that is generated. It will be appreciated that the speed of a rotor blade increases along a length of the rotor blade (known as the asymmetry of lift). In practical terms, the portion of a rotor blade proximal to the rotor hub tends to produce less lift (absent changes to the angle of attack resulting from specific rotor blade geometries) than the distal portion of a rotor blade due to the disparity in speed between the proximal and distal portions. This disclosure recognizes that the drag acting on a helicopter is reduced by covering the rotor hub with a fairing. Minimizing the size of the fairing further optimizes the drag reduction. To minimize the size of the fairing, a compact rotor hub design is disclosed.

Drag acting on the helicopter is further reduced by replacing a portion of the rotor blade proximal to the rotor hub with a rotor extension that produces little to no lift, while at the same time not having a detrimental effect upon the amount of lift produced by the rotor blade. Replacing some of the proximal portion of the rotor blade with a rotor extension of this disclosure reduces drag to improve the aerodynamic efficiency of the aircraft. Implementing one or both of these solutions improves the performance of the helicopter by allowing it to fly more efficiently through the air and at higher speeds.

In some aspects, utilizing rotor extensions can also reduce a cost of each rotor blade as some high-performance rotorcrafts utilize rotor blades made of expensive materials (e.g., composites). Costs are reduced because less material is needed to manufacture the rotor blade due to its shortened length and/or because the proximal portions of a rotor blade often comprise more complex shapes that are more costly to manufacture. Utilizing rotor extensions also allows for the fairing covering the yoke to be packaged more tightly and with smaller openings or cut-outs for the rotor blades as the cross-section of the rotor extension can be made smaller than the cross-section of a conventional rotor blade that attaches to the yoke without a rotor extension. Utilizing a rotor extension also creates a pivot point for blade fold that is positioned farther from yoke, which allows the rotor blade to fully clear the hub assembly for a compact blade fold.

Figure 2B:
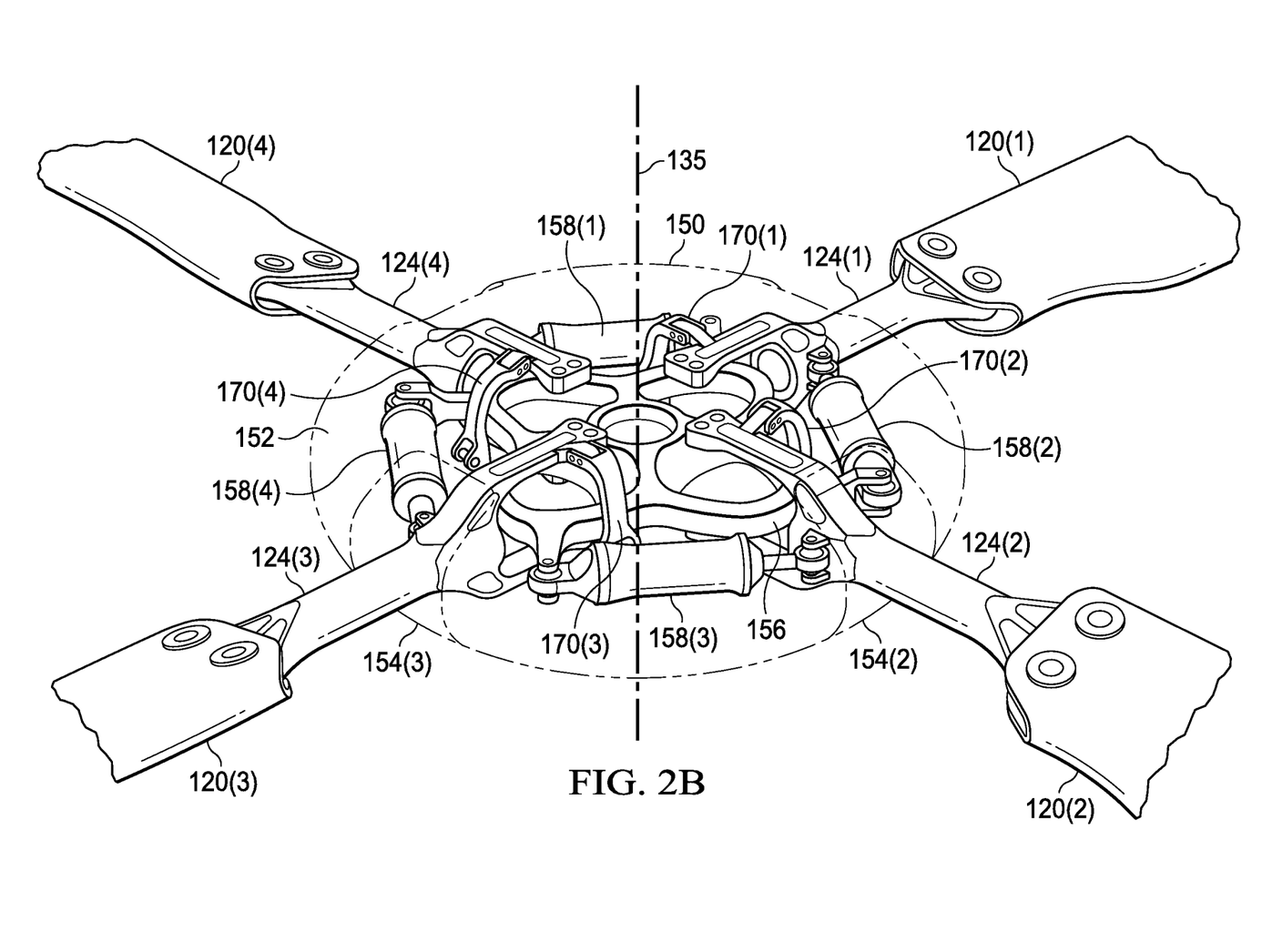

FIGS. 2A and 2B are top and side views, respectively, of main rotor system 110 according to aspects of the disclosure. Main rotor system 110 includes fairing 150 that encloses rotor hub 152 to improve the aerodynamic efficiency of main rotor system 110 by reducing drag. For the purposes of clarity, fairing 150 is illustrated as transparent so that components of rotor hub 152 can be seen. Each rotor blade 120(1)-(4) is coupled to rotor hub 152 via a rotor extension 124(1)-(4). Fairing 150 includes cut-outs 154 that permit rotor extensions 124 to pass through. Each cut-out 154 is dimensioned to accommodate a range of motion of the rotor extension 124 that passes therethrough. For example, during flight, rotor blades 120 pivot about their coupling to rotor hub 152 as a result of various dynamic forces such as flapping, coning, lead/lag, pitch, and the like. Cut-outs 154 are dimensioned to be just large enough to allow rotor extensions 124 to move about rotor hub 152 without contacting edges of cut-outs 154. In typical aspects, the dimensions of cut-outs 154 are minimized to improve the aerodynamic efficiency of fairing 150. In some aspects, covers can be fitted to rotor extensions 124 to cover up open space between rotor extension 124 and cut-outs 154 to further reduce drag.

Rotor hub 152 includes a yoke 156 and dampers 158(1)-(4). Yoke 156 attaches to mast 134 and transmits toque from the engine to rotor blades 120. Yoke 156 includes a hub 160 and rotor couplings 162(1)-(4) that extend from hub 160. Each rotor coupling 162(1)-(4) includes an opening for receiving a bearing assembly 168(1)-(4) (best seen in FIG. 3B) to which rotor extension 124 attaches. Bearing assemblies 168(1)-(4) provide support for centrifugal loads and also provide some dampening. Each rotor coupling 162(1)-(4) includes a damper mount 164(1)-(4), respectively, that secures dampers 158(1)-(4) between yoke 156 and a corresponding damper mount 166(1)-(4) of rotor extensions 124(1)-(4). Damper mounts 164(1)-(4) and 166(1)-(4) are positioned so that dampers 158(1)-(4) can be located inboard and close to axis 135 of mast 134. In some aspects, damper mounts 164(1)-(4) and 166(1)-(4) are positioned on yoke 156 and rotor extensions 124, respectively, so that a central axis passing through dampers 158(1)-(4) forms an angle of between approximately 15 to 75 degrees relative to rotor extension 124(1)-(4), respectively. In some aspects, damper mounts 164(1)-(4) and 166(1)-(4) are positioned on yoke 156 and rotor extensions 124, respectively, so that a central axis passing through dampers 158(1)-(4) forms an angle of approximately 45 degrees relative to rotor extension 124(1)-(4), respectively. Moving dampers 158(1)-(4) closer to axis 135 helps reduce the overall profile of the components of rotor hub 152 to minimize a size of fairing 150, which in turn reduces drag acting on rotorcraft 100. In some aspects, damper mounts 164(1)-(4) could be relocated from rotor couplings 162(1)-(4) to a side of rotor extensions 124(1)-(4) opposite damper mounts 166(1)-(4) to form a rotor-to-rotor damper arrangement.

Figure 3A:
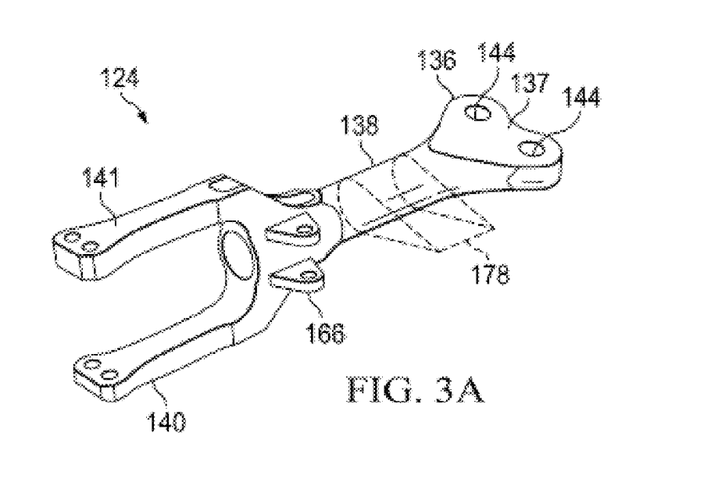
FIGS. 3A 3B and 3C illustrate rotor extensions in accordance with aspects of the disclosure.
Figure 3B:
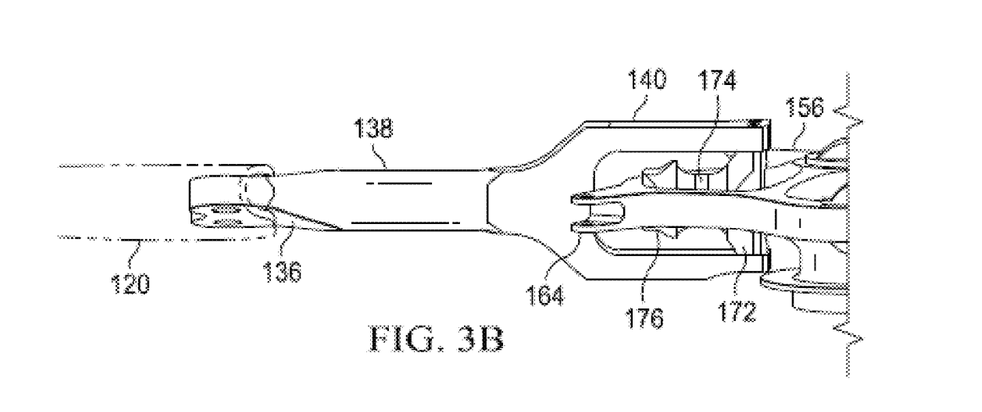

FIGS. 3A and 3B are perspective views of rotor extension 124. FIG. 3A illustrates rotor extension 124 and FIG. 3B illustrates rotor extension 124 attached to rotor blade 120 and yoke 156. Each rotor extension 124 includes a first connector 136, a shaft 138, a second connector 140, and damper mount 166. As illustrated in FIGS. 3A and 3B, first connector 136 is a tongue 136 and second connector 140 is a clevis 140. In other aspects, first and second connectors may comprise other connector types. In some aspects, clevis 140 may include a pitch horn 170 (e.g., see pitch horns 170(1)-(4) in FIG. 2B) that connects to a pitch link that controls a pitch of rotor blades 120. Rotor extension 124 may be made of various materials, including titanium, steel, aluminum, metal matrix composite, composites, and the like.

Tongue 136 includes one or more mounting holes 144 that receive fasteners to secure rotor extension 124 to rotor blade 120. As illustrated in FIGS. 3A and 3B, tongue 136 is configured to fit inside of an opening in an end of rotor blade 120. As illustrated in FIG. 3B, the opening in the end of rotor extension 124 is formed so that an outer profile of rotor blade 120 is not altered and an outer surface of rotor blade 120 remains smooth and unobstructed by connection of rotor extension 124 to rotor blade 120. Rotor blade 120 includes corresponding mounting holes 146 that align with the one or more mounting holes 144. In other aspects, tongue 136 may instead attached to an exterior portion of rotor blade 120.

Rotor blade 120 may be folded about tongue 136 by removing a fastener from the connection between rotor blade 120 and tongue 136. Rotor extension 124 allows for a compact blade fold as the pivot point about tongue 136 is sufficiently far away from rotor hub 152 to allow the rotor blades 120 to clear fairing 130.

Figure 4:
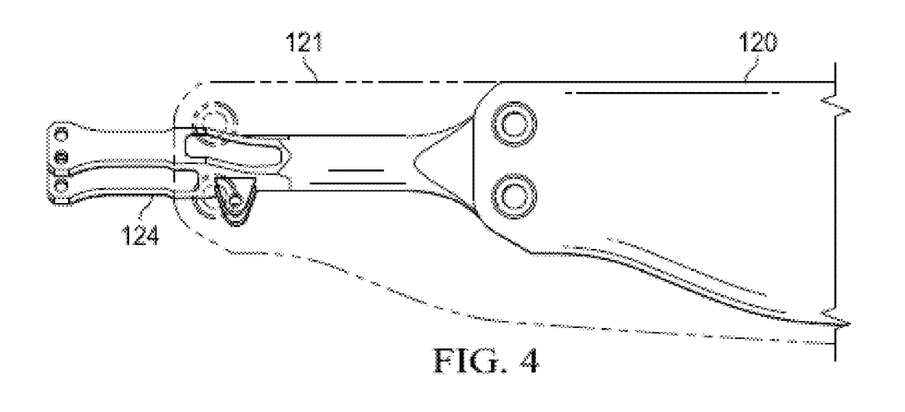
FIG. 4 is a comparative view of a traditional rotor blade and a rotor blade that includes the rotor extension of FIGS. 3A and 3B in accordance with aspects of the disclosure.

Shaft 138 joins tongue 136 with clevis 140. In some aspects, shaft 138 is a hollow tube to reduce a weight of rotor extension 124. Shaft 138 may have a variety of cross-sections, including circular, elliptical, rectangular, polygonal, and the like. As illustrated in FIGS. 3A and 3B, shaft 138 has a circular cross-section. Shaft 138 has a cross-section that is smaller than that of a conventional rotor blade 121, see FIG. 4, which allows the size of cut-outs 154 to be minimized. Having a circular cross-section enables rotor extension 124 to maintain its projected frontal area regardless of the pitch of the rotor blade 120, resulting in a consistent amount of drag generated by shaft 138 regardless of pitch angle. It has been determined that the benefits of minimizing the size of the opening of cut-out 154 outweighs the benefits of using a more aerodynamic shaft 138. For example, using an elliptical cross-section on shaft 138 improves the aerodynamics of the portion of shaft 138 that is outside fairing 150. However, an elliptical cross-section increases the size of cut-out 154. The increase in drag resulting from the larger cut-out 154 results in a net increase in the drag acting on rotorcraft 100.

In some aspects, shaft 138 comprises more than one cross-section to overcome the potential drawbacks of using an elliptical cross-section. For example, a portion of shaft 138 that passes through cut-out 154 may comprise a first cross-section 138a (e.g., circular) and a portion of shaft 138 disposed outside of fairing 150 may comprise a second cross-section 138b (e.g., elliptical), see, e.g., FIG. 3C. Using a circular cross-section for the first cross-section minimizes a size of cut-out 154 and using an elliptical cross-section for the second cross-section optimizes aerodynamics of the portion of shaft 138 disposed outside of fairing 150.

Figure 3C:
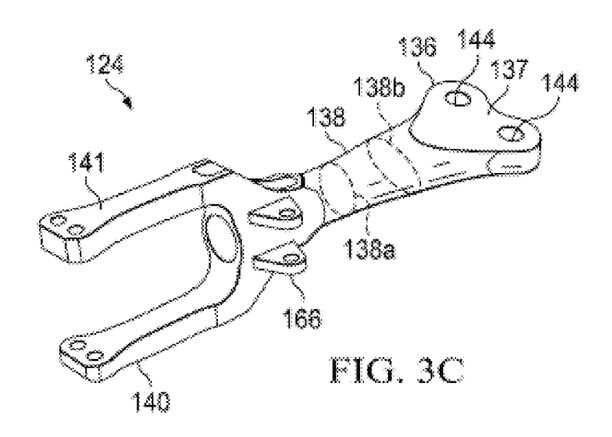

In some aspects, shaft 138 comprises a first cross-section (e.g., circular) and a portion of shaft 138 located outside of fairing 150 includes an extension fairing 178 fitted to shaft 138 to improve the aerodynamics of the portion of shaft 138 located outside fairing 150. Extension fairing 178 may comprise an elliptical shape, a blade-like shape, or other aerodynamic shape to minimize the drag created by the portion of shaft 138 located outside fairing 150. Extension fairing 178 can be a removable piece that attaches to rotor extension 124 via fasteners, adhesives, and the like, or can be integrally formed as a part of rotor extension 124.

Clevis 140 couples to yoke 156 via bearing assembly 168 (best see in FIG. 2A). As illustrated in FIGS. 3A and 3B, clevis 140 is arranged generally vertically. It will be appreciated that clevis 140 could be arranged horizontally or at an angle between horizontal and vertical as needed to allow for rotor extension 124 to attach to a particular yoke. For example, in some aspects rotor couplings 162(1)-(4) could be oriented vertically with each corresponding clevis 140 oriented horizontally. In some aspects, clevis 140 could be replaced with an alternative connection suited to a particular yoke.

In various aspects, tongue 136 and clevis 140 are set at an angle relative to each other to add an amount of blade twist to rotor extension 124. Blade twist describes a geometric twist along a length of the rotor blade to change the rotor blade's pitch along the length of the rotor blade to combat asymmetry of lift. Pitch is decreased as the distance from the hub increases to even out the amount of thrust generated along the length of the rotor blade. FIGS. 3A and 3B illustrate that a face 137 of tongue 136 and a face 141 of clevis 140 are arranged at an angle relative to one another (e.g., not parallel to one another) to introduce an amount of blade twist to rotor blade 120. In some aspects, approximately 10 degrees of blade twist as added via extension 124. In other aspects, more than 10 degrees or less than 10 degrees of blade twist may be added by rotor extension 124. Introducing blade twist via rotor extension 124 may be desirable as the amount of blade twist added by rotor extension 124 does not need to be added to rotor blade 120, which is typically made from expensive composite materials. To incorporate blade twist into the design of rotor blade 120 adds complexity to the structure of rotor blade 120, adding to its cost. In some aspects, rotor extension 124 may be designed without any blade twist, with faces 137 and 141 parallel to one another.

Referring now to FIG. 3B, rotor blade 120 is shown coupled to yoke 156 via rotor extension 124. Bearing assembly 168 couples rotor extension 124 to yoke 156 and comprises an inboard beam 172 and a centrifugal (CF) bearing 174. Inboard beam 172 is coupled to rotor extension 124 at each arm of clevis 140. CF bearing 174 is attached on one side to inboard beam 172 and on a second side to yoke 156 at a bearing seat 176.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A low-drag rotor assembly comprising:
   a yoke comprising a rotor coupling and a first damper mount;
   a rotor extension comprising a first connector, a second connector, a second damper mount, and a shaft extending between the first connector and the second connector, wherein the first connector is attached to a rotor blade and the second connector is attached to the rotor coupling;
   a damper coupled to the first and second damper mounts;
   a fairing enclosing the damper and the yoke, wherein a first portion of the shaft extends through a cut-out in the fairing and a second portion of the shaft is positioned outside of the fairing, the first portion having a circular cross-section and the second portion having an elliptical cross-section.

2. The low-drag rotor assembly of claim 1, wherein a central axis passing through the damper forms an angle between 15° and 75° relative to a central axis passing through the rotor extension.

3. The low-drag rotor assembly of claim 1, wherein the shaft is hollow.

4. The low-drag rotor assembly of claim 3, wherein a central axis passing through the damper forms an angle between 15° and 75° relative to a central axis passing through the rotor extension.

5. The low-drag rotor assembly of claim 1, wherein the first connector comprises a tongue and the second connector comprises a clevis.

6. The low-drag rotor assembly of claim 1, wherein the rotor coupling comprises a bearing assembly.

7. The low-drag rotor assembly of claim 6, wherein the bearing assembly comprises:
   an inboard beam that couples to the yoke; and
   a CF bearing coupled between the inboard beam and a bearing seat of the yoke.

8. The low-drag rotor assembly of claim 1, wherein the first connector and the second connector are disposed on the shaft at an angle relative to one another to introduce an amount of blade twist to the rotor blade.

9. The low-drag rotor assembly of claim 1, wherein a central axis passing through the damper forms an angle of 45° relative to a central axis passing through the rotor extension.

10. A rotorcraft comprising:
   a main rotor system coupled to a mast and comprising a rotor assembly having a yoke and a first damper mount;
   a rotor extension comprising a first connector attached to a rotor blade, a second connector attached to the yoke, a second damper mount, and a shaft extending between the first connector and the second connector;
   a damper coupled to the first and second damper mounts; and
   a fairing enclosing the damper and the yoke, wherein a first portion of the shaft is positioned in a cut-out in the fairing and a second portion of the shaft is positioned outside of the fairing, wherein the first portion has a circular cross-section and the second portion has an elliptical cross-section.

11. The rotorcraft of claim 10, wherein the first connector and the second connector are disposed on the shaft at an angle relative to one another to introduce an amount of blade twist to the rotor blade.

12. The rotorcraft of claim 10, wherein a central axis passing through the damper forms an angle between 15° and 75° relative to a central axis passing through the rotor extension.

13. The rotorcraft of claim 10, wherein the shaft is hollow.

14. The rotorcraft of claim 10, wherein the first connector comprises a tongue and the second connector comprises a clevis.

15. The rotorcraft of claim 14, wherein the clevis is attached to the yoke via a bearing assembly.

16. The rotorcraft of claim 15, wherein the bearing assembly comprises:
   an inboard beam that couples to the yoke; and
   a CF bearing coupled between the inboard beam and a bearing seat of the yoke.

17. The rotorcraft of claim 10, wherein the first connector and the second connector are disposed on the shaft at an angle relative to one another to introduce an amount of blade twist to the rotor blade; and
   the second connector comprises a clevis attached to the yoke via a bearing assembly.

18. The rotorcraft of claim 17, wherein the shaft is hollow.

19. The rotorcraft of claim 17, wherein the bearing assembly comprises:
   an inboard beam that couples to the yoke; and
   a CF bearing coupled between the inboard beam and a bearing seat of the yoke.

20. The rotorcraft of claim 19, wherein the shaft is hollow.

* * * * *